United States Patent
Edmiston et al.

(10) Patent No.: US 10,176,012 B2
(45) Date of Patent: Jan. 8, 2019

(54) METHOD AND APPARATUS FOR IMPLEMENTING DETERMINISTIC RESPONSE FRAME TRANSMISSION

(71) Applicants: Graham Edmiston, Bridge of Weir (GB); Dennis Martyn Gallop, Glasgow (GB); Heinz Klaus Richard Wrobel, Gauting (DE)

(72) Inventors: Graham Edmiston, Bridge of Weir (GB); Dennis Martyn Gallop, Glasgow (GB); Heinz Klaus Richard Wrobel, Gauting (DE)

(73) Assignee: NXP USA, Inc., Austin, TX (US)

( * ) Notice: Subject to any disclaimer, the term of this patent is extended or adjusted under 35 U.S.C. 154(b) by 587 days.

(21) Appl. No.: 14/568,298

(22) Filed: Dec. 12, 2014

(65) Prior Publication Data
US 2016/0173416 A1    Jun. 16, 2016

(51) Int. Cl.
  *G06F 9/48* (2006.01)
  *G06F 9/54* (2006.01)

(52) U.S. Cl.
  CPC .......... *G06F 9/4843* (2013.01); *G06F 9/4887* (2013.01); *G06F 9/54* (2013.01)

(58) Field of Classification Search
None
See application file for complete search history.

(56) References Cited

U.S. PATENT DOCUMENTS 5,982,842 A * 11/1999 Ohtsuka ................. G04F 1/005
                                                        327/151
6,026,460 A *  2/2000 David .................. G06F 13/4036
                                                        710/309
(Continued)

FOREIGN PATENT DOCUMENTS

CN    101304374 A    11/2008
WO    2009098542 A1   8/2009
(Continued)

OTHER PUBLICATIONS

Burns, Alan, "Preemptive priority based scheduling: An appropriate engineering approach," University of York, Department of Computer Science, 1993, 24 Pages.
(Continued)

*Primary Examiner* — Jeffrey M Rutkowski
*Assistant Examiner* — Ning Li

(57) ABSTRACT

There is provided a network interface module, and a method of implementing deterministic response frame transmission therein. The network interface module comprises a processor core arranged to execute a set of threads, the set of threads comprising at least one transmit thread arranged to cause a response frame to be transmitted upon expiry of a minimum response period from a response triggering event occurring. The network interface module further comprises a timing component arranged to output a masking timeout signal indicating expiration of successive masking timeout intervals, and a masking component arranged to mask the transmit thread from being scheduled for execution by the processing core. The masking component being further arranged to receive the masking timeout signal output by the timing component and to unmask the transmit thread upon expiry of a masking timeout interval.

20 Claims, 14 Drawing Sheets

(56) References Cited

U.S. PATENT DOCUMENTS

| | | |
|---|---|---|
| 6,233,243 B1 | 5/2001 | Ganmukhi et al. |
| 6,556,571 B1 | 4/2003 | Shahrier et al. |
| 6,671,275 B1 | 12/2003 | Wong et al. |
| 6,745,258 B1 | 6/2004 | Pellegrino et al. |
| 6,928,470 B1 | 8/2005 | Hamlin |
| 6,952,824 B1 | 10/2005 | Hooper et al. |
| 7,103,683 B2 | 9/2006 | Madukkarumukumana et al. |
| 7,391,787 B1 | 6/2008 | McCrosky |
| 7,613,201 B1 | 11/2009 | Yang et al. |
| 7,653,086 B2 | 1/2010 | Beser |
| 7,707,281 B2 | 4/2010 | Baretzki |
| 7,769,015 B2 | 8/2010 | Huang et al. |
| 7,805,706 B1 | 9/2010 | Ly et al. |
| 8,155,082 B2 | 4/2012 | Yamaguchi et al. |
| 8,276,142 B2 | 9/2012 | Alameldeen et al. |
| 8,295,287 B2 | 10/2012 | Chandhoke |
| 8,649,354 B2 | 2/2014 | Kenington et al. |
| 9,612,881 B2 | 4/2017 | Edmiston |
| 2002/0118692 A1 | 8/2002 | Oberman et al. |
| 2003/0167348 A1* | 9/2003 | Greenblat ............... H04L 12/42 709/251 |
| 2003/0172189 A1 | 9/2003 | Greenblat |
| 2003/0208521 A1 | 11/2003 | Brenner et al. |
| 2004/0153700 A1 | 8/2004 | Nixon et al. |
| 2004/0168078 A1* | 8/2004 | Brodley ................... G06F 21/52 713/190 |
| 2005/0117575 A1 | 6/2005 | Konda |
| 2005/0240745 A1 | 10/2005 | Iyer et al. |
| 2005/0270173 A1 | 12/2005 | Boaz |
| 2006/0114907 A1 | 6/2006 | Wu |
| 2006/0159103 A1 | 7/2006 | Jain et al. |
| 2006/0282638 A1 | 12/2006 | Oshima et al. |
| 2007/0174828 A1 | 7/2007 | O'Brien et al. |
| 2008/0019395 A1 | 1/2008 | Aithal |
| 2008/0104659 A1* | 5/2008 | West ................... H04N 21/2662 725/148 |
| 2008/0184233 A1 | 7/2008 | Norton et al. |
| 2008/0186983 A1 | 8/2008 | Dielissen et al. |
| 2008/0192661 A1* | 8/2008 | Hamamoto ............. H04L 47/10 370/310 |
| 2008/0201561 A1 | 8/2008 | Bates et al. |
| 2009/0240895 A1 | 9/2009 | Nyland et al. |
| 2009/0248935 A1* | 10/2009 | Ehrlich ................... G06F 13/26 710/264 |
| 2010/0046539 A1 | 2/2010 | Frohna et al. |
| 2010/0083267 A1* | 4/2010 | Adachi ................. G06F 9/3851 718/103 |
| 2010/0162265 A1 | 6/2010 | Heddes |
| 2010/0205245 A1 | 8/2010 | Le Scouarnec et al. |
| 2010/0250811 A1* | 9/2010 | Kawashita ............. G06F 13/24 710/260 |
| 2010/0332698 A1 | 12/2010 | Muller |
| 2011/0149850 A1* | 6/2011 | Sashihara ............. H04W 48/16 370/328 |
| 2011/0153822 A1 | 6/2011 | Rajan et al. |
| 2011/0302336 A1* | 12/2011 | Naylor ................ G06F 13/1626 710/35 |
| 2012/0014489 A1* | 1/2012 | Liu ........................ H04W 56/00 375/360 |
| 2012/0066683 A1 | 3/2012 | Srinath |
| 2012/0072916 A1 | 3/2012 | Hintermeister et al. |
| 2012/0081378 A1 | 4/2012 | Roy et al. |
| 2012/0159245 A1 | 6/2012 | Brownlow et al. |
| 2012/0188987 A1 | 7/2012 | Chin et al. |
| 2013/0097384 A1 | 4/2013 | Suzuki et al. |
| 2013/0275985 A1 | 10/2013 | Lim |
| 2014/0006757 A1 | 1/2014 | Assarpour |
| 2014/0019803 A1 | 1/2014 | Busaba et al. |
| 2014/0029625 A1* | 1/2014 | Edmiston .............. H04L 49/257 370/401 |
| 2014/0201556 A1* | 7/2014 | Attar ................... H04W 52/0245 713/340 |
| 2014/0215162 A1 | 7/2014 | Steeley, Jr. et al. |
| 2014/0351825 A1 | 11/2014 | Xu et al. |
| 2015/0135182 A1 | 5/2015 | Liland et al. |
| 2015/0139653 A1* | 5/2015 | Binkert ................ H04J 14/0256 398/79 |
| 2015/0223198 A1* | 8/2015 | Du ..................... H04W 52/0203 455/458 |
| 2015/0324198 A1 | 11/2015 | Alsup et al. |
| 2016/0041933 A1 | 2/2016 | Trojanowski et al. |
| 2016/0173335 A1 | 6/2016 | Edmiston |
| 2016/0173416 A1 | 6/2016 | Edmiston et al. |
| 2016/0292017 A1 | 10/2016 | Du |
| 2016/0323141 A1 | 11/2016 | Joshi et al. |
| 2017/0003972 A1 | 1/2017 | Elliott et al. |

FOREIGN PATENT DOCUMENTS

| | | | |
|---|---|---|---|
| WO | | 2012143757 A1 | 10/2012 |
| WO | WO 2012/143757 A1 * | 10/2012 | ............. H04L 12/56 |

OTHER PUBLICATIONS

Final Office Action for U.S. Appl. No. 14/568,321; 24 pages (dated Jan. 25, 2018).

Non Final Office Action for U.S. Appl. No. 14/568,321; 25 pages (dated Aug. 15, 2017).

Non Final Office Action for U.S. Appl. No. 15/213,875; 18 pages (dated Feb. 27, 2018).

U.S. Appl. No. 14/568,321, Edmiston, Graham: "Network Interface Module and A Method of Changing Network Configuration Parameters Within a Network Device", filed Dec. 12, 2014.

U.S. Appl. No. 15/213,875, Edmiston, Graham: "A Heterogeneous Multi-Processor Device and Method of Enabling Coherent Data Access Within a Heterogeneous Multi-Processor Device", filed Jul. 19, 2016.

Office Action, Final Rejection, U.S. Appl. No. 15/213,875; dated Jul. 16, 2018; 34 Pages.

Non-Final Office Action for U.S. Appl. No. 14/568,321; dated Oct. 2, 2018; 34 Pages.

* cited by examiner

METHOD AND APPARATUS FOR IMPLEMENTING DETERMINISTIC RESPONSE FRAME TRANSMISSION

FIELD OF THE INVENTION

This invention relates to a network interface module and a method of implementing deterministic response frame transmission therein.

BACKGROUND OF THE INVENTION

In the field of computer network protocols, and in particular industrial computer network protocols, network nodes are often required to transmit a frame after a defined period of time following the occurrence of an event. Examples of such events following which a frame is to be transmitted may comprise, say, receipt of specific messages, interrupts, error cases, counters reaching respective thresholds, changes of state in a state diagram, etc.

For example, PROFIBUS (Process Field Bus) is a computer network protocol standard for fieldbus communication in automation technology, used in automation applications for the control of productions lines and other machinery. A typical PROFIBUS network contains master nodes and slave nodes. When a master node sends a request to a slave node, the slave node must respond (e.g. transmit a response frame) after a system wide minimum response time. The PROFIBUS protocol requires that responses are issued after a programmable system wide minimum response time has expired in order to ensure slower devices have sufficient time to process the request.

To transmit a response frame deterministically (within a user defined latency and jitter), in response to, say, a request received in a request frame, dedicated hardware or timers are often used within the MAC (media access control) layer of the network interface node to tightly control the latency and jitter. However, providing such dedicated hardware increases the cost of the hardware components within each node. In order to enable lower costs solutions to be implemented, it is desirable to use more generic MAC modules, for example UART (universal asynchronous receiver/transmitter) MAC modules.

To transmit a response frame deterministically (within a user defined latency and jitter), in response to, say, a request frame using such a generic MAC module requires the timing of the transmission of frames in response to events to be controlled within software, for example by way of the transmit threads responsible for the transmission of the frames, such threads typically running on a RISC (Reduced Instruction Set Computer) processor operably coupled to the MAC module. Conventionally, such control is implemented through the use of a response timer, which is initialised upon the occurrence of the respective event (e.g. the receipt of a master node request in a PROFIBUS network), with expiry of the response timer triggering the transmission of the response frame.

Generic MAC modules often have independent Rx (receiver) and Tx (transmit) threads running on the RISC processor for each port, with each port comprising separate Rx and Tx FIFO buffers. When the Tx FIFO buffer has available capacity, it generates a request to the Tx thread for data to be transmitted. If data is available for transmission the Tx thread will cause a unit of data (e.g. a UART character) to be placed into the Tx FIFO buffer in response to each request received from the Tx FIFO buffer.

Conventionally, the Tx thread for a port is enabled to service requests indefinitely. This allows the Tx thread to be able to service a request from the Tx FIFO buffer for new data to transmit as quickly as possible in order to minimise any latency in the transmission of data. In particular, by enabling the Tx thread to service requests indefinitely, the Tx thread is able to place response frame data within the Tx FIFO buffer for transmission as soon as the response timer has expired and the RISC processor stops processing its current task (assuming the Tx FIFO buffer has available capacity). However, a problem with such a conventional solution is that when no data is available for transmission, or the response timer has not yet expired, the Tx thread will continuously be running to handle the Tx FIFO requests when no data is available to transmit, consuming a lot of unnecessary bus and RISC processor bandwidth.

SUMMARY OF THE INVENTION

The present invention provides a network interface module and a method of implementing deterministic response frame transmission within a network interface module as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention will now be described with reference to the accompanying drawings. However, it will be appreciated that the present invention is not limited to the specific examples herein described and as illustrated in the accompanying drawings. For example, the present invention will be described in some parts with reference to response triggering events comprising response requests received from a master node within a PROFIBUS network. However, as outlined in greater detail below, the present invention is not limited to PROFIBUS applications, nor to response triggering events comprising response requests received from a master node.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In accordance with some examples of one aspect of the present invention, there is provided a network interface module arranged to transmit and receive data frames over a computer network. The network interface module comprises at least one processor core arranged to execute a set of threads, the set of threads comprising at least one transmit thread arranged to cause a response frame to be transmitted upon expiry of a minimum response period from a response triggering event occurring. The network interface module further comprises at least one timing component arranged to output a masking timeout signal indicating expiration of successive masking timeout intervals, and at least one masking component arranged to mask the transmit thread from being scheduled for execution by the at least one processing core, the at least one masking component being further arranged to receive the masking timeout signal output by the at least one timing component and to unmask the transmit thread upon expiry of a masking timeout interval.

In this manner, the scheduling of the transmit thread is arranged to be masked and periodically (upon expiration of successive masking timeout intervals) unmasked to prevent the transmit thread from continuously being scheduled for execution when no data is available to transmit (e.g. when there is no data to transmit or when the minimum response period for transmitting data has not yet expired). As a result, unnecessary bus and processor bandwidth consumption may be significantly avoided.

Figure 1:
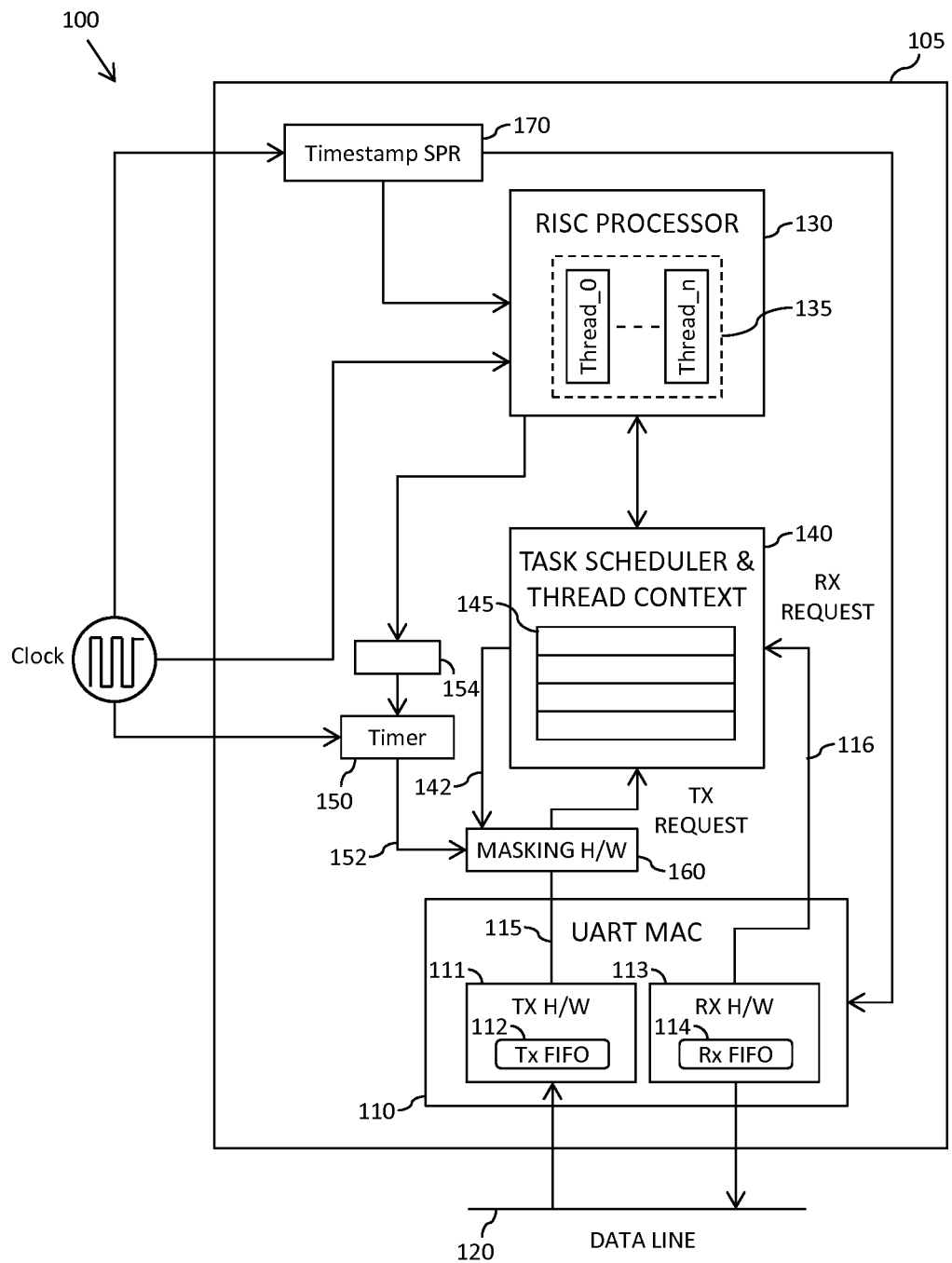
FIG. 1 illustrates a simplified block diagram of an example of a network interface module.

Referring now to FIG. 1, there is illustrated a simplified block diagram of an example of a network interface module 100 arranged to transmit and receive data frames over a computer network, such as a PROFIBUS (Process Field Bus) network, Ethernet network, etc. In the example illustrated in FIG. 1, the network interface module 100 is implemented within an integrated circuit device 105 comprising at least one die within a single integrated circuit package.

The network interface module 100 comprises one or more ports, such as the UART (universal asynchronous receiver/transmitter) MAC (media access control) port indicated at 110 via which the network interface module 100 is able to be coupled to one or more computer networks, such as the computer network 120. The port 110 comprises separate transmit (Tx) and receive (Rx) hardware 111, 113, which comprise separate Tx and Rx buffers 112, 114 for data to be transmitted over the computer network 120 and data received over the computer network 120 respectively.

The network interface module 100 further comprises at least one processor core, such as the RISC (reduced instruction set computer) processor core 130 illustrated in FIG. 1. The processing core(s) 130 is/are arranged to execute a set of threads, indicated generally at 135. A task scheduling component 140 is arranged to control when threads can be executed by the processor core(s) 130, and stores therein thread context information 145 for configuring the processor core(s) 130 to execute the threads 135.

The network interface module 100 in the illustrated example is required to transmit a response frame after a defined minimum period of time (hereinafter referred to as the "minimum response period") following the occurrence of a specific event, or type of event. Such a minimum response period may be defined in software, and/or configured within one or more registers (not shown). The set of threads 135 arranged to be executed by the processing core(s) 130 comprises a transmit (Tx) thread arranged to cause such a response frame to be transmitted upon expiry of a minimum response period from a response triggering event occurring.

Figure 2:
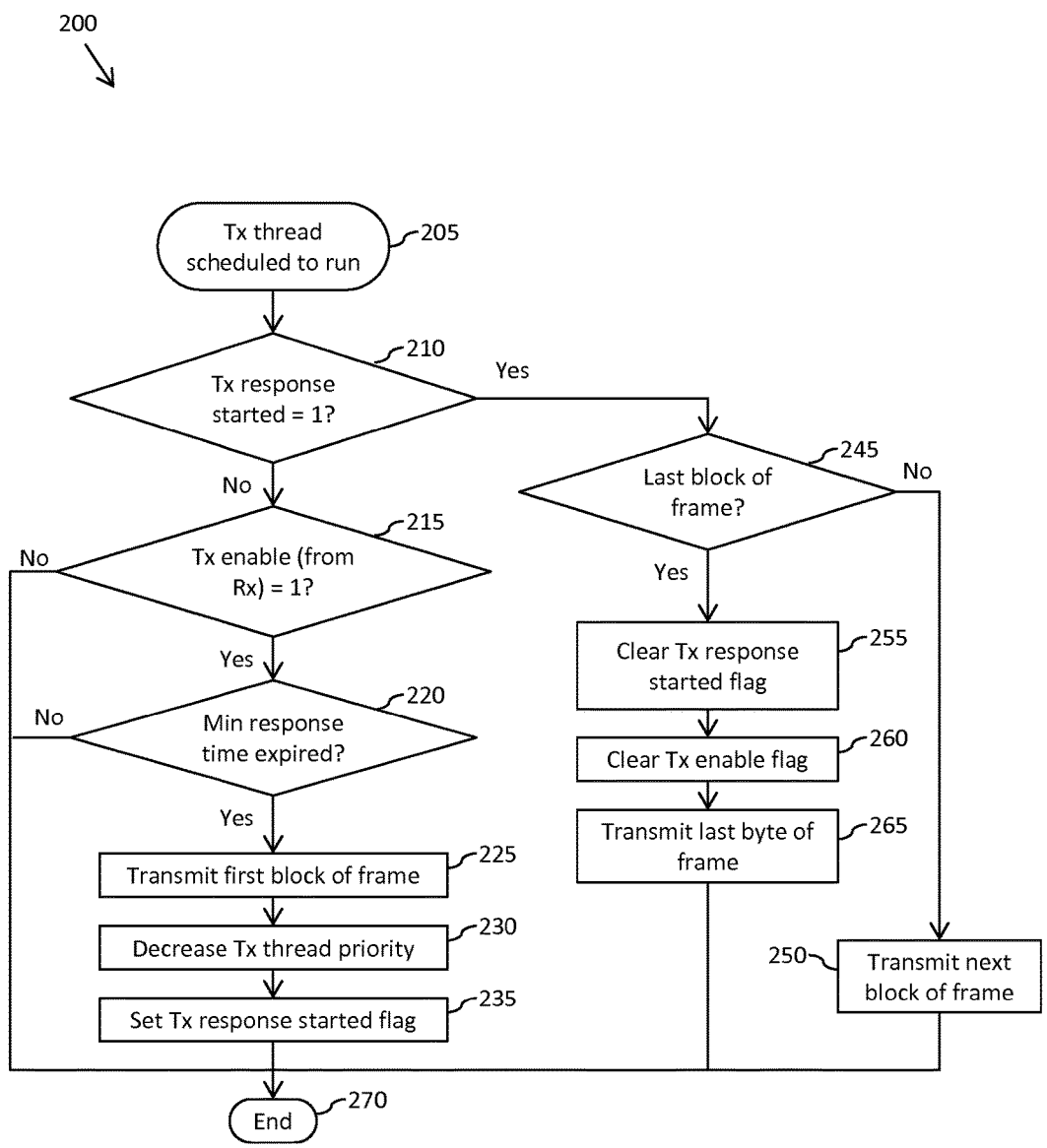
FIG. 2 illustrates an example of a simplified flowchart for a transmit thread process.

FIG. 2 illustrates an example of a simplified flowchart 200 for the TX thread process. The Tx thread starts at 205 by being scheduled to be executed (run) on the (or a) processing core 130 by the task scheduling component 140. For example, the task scheduling component 140 may schedule a thread to be executed on a processing core 130 by loading the context for that thread into the internal memory/registers of the processing core 130, the context comprising a set of data defining a processing core state for that thread. The Tx thread then moves on to 210, where it determines whether a transmit response started flag has been set, indicating that the transmission of a response frame has already been started.

If it is determined that the transmit response started flag has not been set (e.g. comprises a logical '0' value), and thus that the transmission of a response frame has not been started, the Tx thread moves on to 215, where it determines whether a transmit enable flag has been set, indicating that a response frame is required to be transmitted. If it is determined that the transmit enable flag has not been set (e.g. comprises a logical '0' value), the Tx thread may then finish, at 270. Conversely, if it is determined that the transmit enable flag has been set (e.g. comprises a logical '1' value), the Tx thread moves on to 220, where it determines whether the minimum response period from a response triggering event has expired. For example, the response triggering event may be timestamped, for example in accordance with a timestamp value within a timestamp special purpose register 170. Accordingly, the Tx thread may be arranged to identify the timestamp for the response triggering event, and calculate the amount of time that has elapsed since the response triggering event occurred. Alternatively, a timer may be initialised upon the response triggering event occurring to expire after the minimum response period, and the Tx thread may be arranged to determine whether the timer has expired. If it is determined that the minimum response time has not expired, the Tx thread may then finish, at 270. However, if it is determined that the minimum response time has expired, the Tx thread proceeds within initiating the transmission of the response frame, as illustrated at steps 225 to 235. For example, the Tx thread may be arranged to cause the first block of data for the response frame to be transmitted, as indicated at 225, by loading the first block of data into the Tx buffer 112 (FIG. 1) within the port 110, to enable the Tx hardware 111 of the port 110 to transmit the block of data. The Tx thread may then set the transmit response started flag (e.g. set it to a logical '1' value), as indicated at 235. In the illustrated example, the Tx thread is further arranged to decrease its priority level, at 230, in response to its priority level within the task scheduling component having previously been increased as described in greater detail below. The Tx thread may then finish, at 270.

Referring back to 210, if it is determined that the transmit response started flag has been set (e.g. comprises a logical '1' value), and thus that the transmission of a response frame has been started, the Tx thread moves on to 245 where it determines whether the next block of data to be transmitted for the response frame is the last block of the frame. If it is determined that the next block of data to be transmitted is not the last block of the frame, the Tx thread moves on to 250 where Tx thread is arranged to cause the next block of data for the response frame to be transmitted, for example by loading the next block of data into the Tx buffer 112 (FIG. 1). The Tx thread may then finish, at 270. Conversely, if it is determined that the next block of data is the last block of data for the response frame, the Tx thread clears the transmit response started flag (e.g. e.g. sets it to a logical '0' value), at 255, clear the transmit enable flag (e.g. set it to a logical '0' value), as indicated at 260, and cause the last block of data for the response frame to be transmitted, for example by loading the next block of data into the Tx buffer 112 (FIG. 1), as indicated at 265. The Tx thread may then finish, at 270.

To transmit a response frame deterministically (within a user defined latency and jitter), in response to a response triggering event using a generic MAC module such as the UART port module 110 illustrated in FIG. 1, requires the timing of the transmission of frames in response to events to be controlled within software, for example by way of the Tx thread(s) responsible for the transmission of the frames. Such control may be implemented through timestamping the response triggering event or through the use of a response timer, which is initialised upon the occurrence of the respective event (e.g. the receipt of a master node request in a PROFIBUS network), with expiry of the response timer triggering the transmission of the response frame.

When the Tx buffer 112 has available capacity, it generates a Tx request signal 115. The Tx request signal 115 is provided to the task scheduling component 140, and indicates to the task scheduling component 140 that the Tx buffer 112 has available capacity for receiving a block of data for transmission and that the Tx thread for the port 110 is required to be executed in order to load the next block of data for transmission into the Tx buffer 112. Thus, the task scheduling component 140 is arranged to receive Tx request signals 115 from the Tx buffer 112, and to schedule the Tx thread for execution by the processing core(s) 130 upon receipt of a Tx request signal 115. If data is available for transmission, the Tx thread (upon being executed by the processing core 130) will cause a block of data (e.g. a UART character) to be placed into the Tx buffer 112.

Conventionally, the Tx thread would be enabled to service Tx request signals 115 indefinitely, and as such would be scheduled for execution in response to each Tx request signal 115 received from the Tx buffer 112. However, a problem with such a conventional implementation is that when no data is available for transmission, or the minimum response period for transmitting a response has not yet expired, the Tx thread will continuously be scheduled to service Tx request signals 115 when no data is available to transmit, consuming a lot of unnecessary bus and processor bandwidth.

In the example illustrated in FIG. 1, the network interface module 100 further comprises a timing component 150 arranged to output a masking timeout signal 152 indicating expiration of successive masking timeout intervals. In the illustrated example, the timing component 150 comprises a timer operably coupled to a memory element 154, for example a configurable register, within which a masking timeout parameter value is stored. The timer 150 is arranged to time masking timeout intervals corresponding to the masking timeout value stored within the memory element 154, and to output the masking timeout signal 152 indicating expiration of successive masking timeout intervals.

The network interface module 100 further comprises a masking component arranged to mask the Tx thread from being scheduled for execution by the processing core(s) 130. In the example illustrated in FIG. 1, the masking component a gating circuit 160 arranged to mask the at Tx request signals 115 output by the Tx buffer 112. In this manner, by masking the Tx request signals 115 output by the Tx buffer 112, the task scheduling component 140 may be masked from the fact that the Tx buffer 112 has available capacity for receiving a block of data for transmission and that the Tx thread for the port 110 is required to be executed in order to load the next block of data for transmission into the Tx buffer 112. Accordingly, while the Tx request signals 115 is masked by the gating circuit 160, the task scheduling component 140 will not schedule the Tx thread for execution by the processing core(s). Thus, by masking the Tx request signals 115, the gating circuit 160 masks the Tx thread from being scheduled for execution by the processing core(s) 130.

The gating circuit 160 is arranged to receive the masking timeout signal 152 output by the timing component 150, and to unmask the transmit thread upon expiry of a masking timeout interval, as indicated by the masking timeout signal 152. In this manner, upon expiry of the masking timeout interval, the Tx request signal 115 is unmasked, allowing the Tx request signal output by the Tx buffer 112 to be received by the task scheduling component 140, enabling the task scheduling component 140 to identify that the Tx buffer 112 has available capacity for receiving a block of data for transmission and that the Tx thread for the port 110 is required to be executed in order to load the next block of data for transmission into the Tx buffer 112. Thus, upon expiry of the masking timeout interval, and assuming the Tx buffer 112 has available capacity and has output a Tx request signal 115 to indicate as such, the Tx thread may be scheduled for execution by the processing core(s) 130. Upon execution of the Tx thread by the/a processing core(s) 130, the Tx request signal 115 may again be masked, for example by way of the gating circuit 160. Thus, by masking and unmasking the Tx thread upon expiry of successive masking timeout intervals in this manner, the Tx thread may be prevented from continuously being scheduled to service Tx request signals 115 when no data is available to transmit (e.g. when there is no data to transmit or when the minimum response period for transmitting data has not yet expired). As a result, unnecessary bus and processor bandwidth consumption may be significantly avoided.

Figure 3:
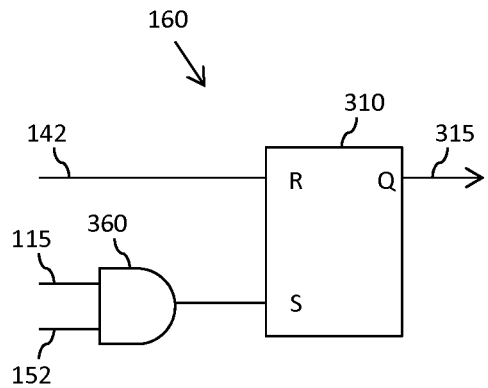
FIG. 3 illustrates a simplified circuit diagram of an example of a gating circuit.

FIG. 3 illustrates a simplified circuit diagram of an example of the gating circuit 160. In the example illustrated in FIG. 3 the gating circuit comprises a combinational logic gate 360, which in the illustrated example comprises an AND gate. A first input of the AND gate 360 is arranged to receive Tx request signals 115 output by the Tx buffer 112. A second input of the AND gate 360 is arranged to receive the masking timeout signal 152 output by the timing component 150. An output of the AND gate 360 is provided to a set input of an RS flip-flop 310. In this manner, when the RS flip-flop 310 is in a reset condition, a transition of the signal output by the AND gate 360 from a logical '0' to a logical '1' will cause the RS flip-flop 310 to transition its output from a logical '0' to a logical '1', and to hold the logical '1' at its output until a reset signal is received.

The timing component 150 in the illustrated example is arranged to hold the masking timeout signal 152 at a logical '0' during masking timeout intervals, and to temporarily (e.g. for one or more clock cycle(s)) configure the masking timeout signal 152 to comprise a logical '1' upon expiration of each masking timeout interval. In this manner, during a masking timeout interval when the masking timeout signal 152 comprises a logical '0', the output of the AND gate 360 is held at a logical '0' by the logical '0' of the masking timeout signal 152 received at its first input, irrespective of the logical value of the Tx request signal 115 received at its second input. In this manner, the AND gate 360 masks the Tx request signal 115. Upon expiration of a masking timeout interval, the masking timeout signal 152 received at the first input of the AND gate 360 transitions to a logical '1'. As a result, the output of the AND gate 360 is no longer held at a logical '0', and outputs the signal received at its second input; e.g. the Tx request signal 115. Assuming the Tx buffer 112 has available capacity and has set the Tx request signal 115 to comprise a logical '1' to indicate as such, upon expiry of a masking timeout interval the output of the AND gate 360 will transition to a logical '1'. Assuming the RS flip-flop 310 is in a reset condition (e.g. has been reset since previously being set), the transition of the output of the AND gate 360 to a logical '1' will cause the RS flip-flop 310 to transition its output from a logical '0' to a logical '1', matching (and thereby effectively unmasking) the Tx request signal 115. The RS flip-flop 310 is arranged to hold the logical '1' at its output until a reset signal is received. In this manner, when the timing component 150 resumes holding the masking timeout signal 152 at a logical '0' during the next masking timeout interval (e.g. after one or more clock cycle(s)), the output of the RS flip-flop 310 remains matching the logical '1' of the Tx request signal 115.

In some examples, the task scheduling component 140 may further be arranged to cause the masking component to mask the Tx thread from subsequently being scheduled for execution, upon scheduling the Tx thread for execution by the processing core(s) 130. For example, and as illustrated in FIG. 1, the thread scheduling component 140 may be arranged to output a masking signal 142 to the masking component, which in the example illustrated in FIG. 1 is provided to the gating circuit 160. As illustrated in FIG. 3, the masking signal 142 is operably coupled to the reset input of the RS flip-flop 310. The task scheduling component 140 may by default be arranged to hold the masking signal 142 at a logical '0'. Upon scheduling of the Tx thread, the task scheduling component 140 may be arranged to temporarily (e.g. for one or more clock cycle(s)) set the masking signal 142 to a logical 1'. In this manner, the resulting logical '1' received at the reset input of the RS flip-flop 310 will force the RS flip-flop 310 into a reset condition, whereby the RS flip-flop 310 outputs a logical '0' until a set signal (a logical '1' in the illustrated example) is subsequently received at its set input. In this manner, whilst a logical '0' is output by the RS flip-flop 310, the task scheduler component 140 will assume no Tx request signal 115 is output by the Tx buffer 112, and thus will not schedule the Tx thread for execution by the processing core(s) 130. As described above, the Tx request signal 115 will be masked by the AND gate 360 until the timing component 150 subsequently configures the masking timeout signal 152 to comprise a logical '1' upon expiration of the next masking timeout interval.

In this manner, the scheduling of the Tx thread is arranged to be masked and periodically (upon expiration of successive masking timeout intervals) unmasked to prevent the Tx thread from continuously being scheduled to service Tx request signals 115 when no data is available to transmit (e.g. when there is no data to transmit or when the minimum response period for transmitting data has not yet expired). As a result, unnecessary bus and processor bandwidth consumption may be significantly avoided.

It will be appreciated that the example the gating circuit 160 illustrated in FIG. 3 is just one possible example of implementing a gating circuit for masking the at Tx request signals 115 output by the Tx buffer 112, and it is contemplated that any suitable alternative gating circuit may equally be implemented. For example, it is contemplated that the AND gate 360 may be replaced with a NAND gate, with the output of the NAND gate being provided to an inverting set input of the RS flip-flop 310.

Figure 4:
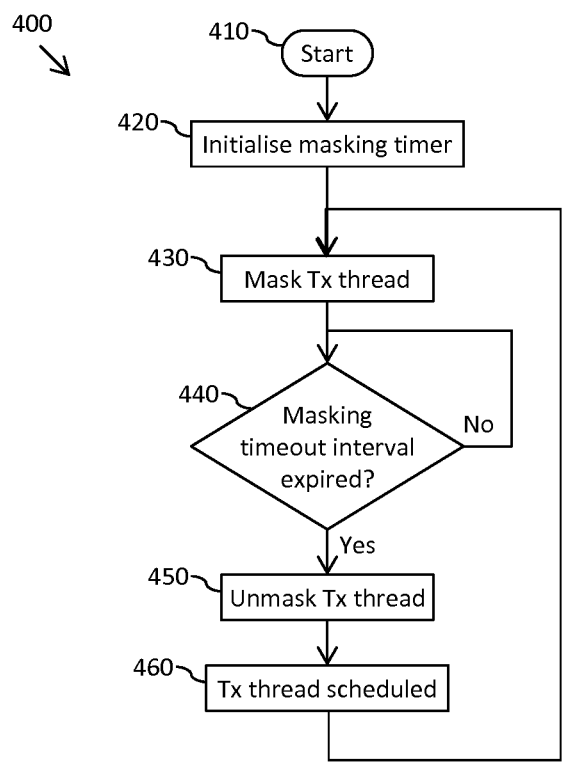
FIG. 4 illustrates a simplified flowchart of an example of a method of masking a transmit thread.

FIG. 4 illustrates a simplified flowchart 400 of an example of a method of masking a Tx thread, such as that implemented within the network interface module 100 illustrated in FIG. 1. The process starts at 410, and moves on to 420 where a masking timeout interval timer is initialised. In the example illustrated in FIG. 1, such initialisation may comprise writing a masking timeout interval parameter value to the memory element 154 to configure the timer 150 to output a masking timeout signal 152 indicating expiration of successive masking timeout intervals of a predefined duration. The process then moves on to 430 where the Tx thread is masked. In the example illustrated in FIGS. 1 and 3, the Tx thread may be masked by the task scheduler component 140 temporarily (e.g. for one or more clock cycle(s)) setting the masking signal 142 to a logical 1' to force the RS flip-flop 310 into a reset condition. The process then waits, at 440, until the mask timeout interval expires. Upon the masking timeout interval expiring, the process moves on to 450, where the Tx thread is unmasked. In the example illustrated in FIGS. 1 and 3, the Tx thread is unmasked by way of, upon expiration of a masking timeout interval, the masking timeout signal 152 received at the first input of the AND gate 360 transitions to a logical '1'. As a result, the output of the AND gate 360 is no longer held at a logical '0', and outputs the signal received at its second input; e.g. the Tx request signal 115. Assuming the Tx buffer 112 has available capacity and has set the Tx request signal 115 to comprise a logical '1' to indicate as such, upon expiry of a masking timeout interval the output of the AND gate 360 will transition to a logical '1'. Assuming the RS flip-flop 310 is in a reset condition (e.g. has been reset since previously being set), the transition of the output of the AND gate 360 to a logical '1' will cause the RS flip-flop 310 to transition its output from a logical '0' to a logical '1', matching the Tx request signal 115, thereby unmasking the Tx request signal 115, and thus unmasking the Tx thread and allowing it to be scheduled for execution. Accordingly, the Tx thread is then scheduled at 460. The process then loops back to 430, where the Tx thread is once again masked until expiry of the next masking timeout interval.

As previously mentioned, the Tx thread is arranged to cause a response frame to be transmitted upon expiry of a minimum response period from a response triggering event occurring. Examples of such events following which a frame is to be transmitted may comprise, for example, receipt of specific frames such as response request messages from a master node in a PROFIBUS network, specific messages received internally (for example software messages, messages from virtual ports implemented in software, and messages from other software stack emulation schemes that may be present), interrupts, error cases, counters reaching respective thresholds, changes of state within a network element of which the network interface module forms a part, etc.

Figure 5:
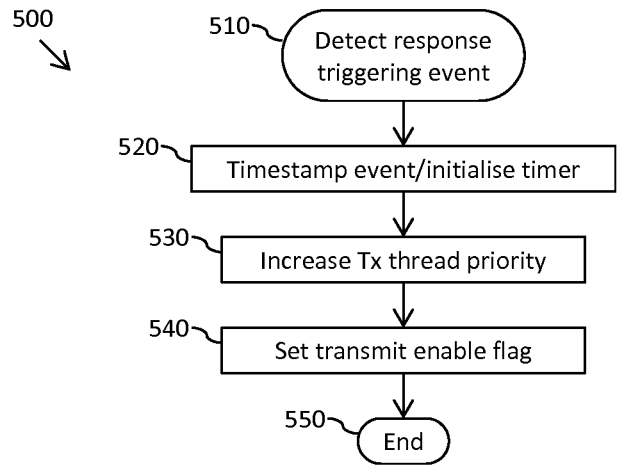
FIG. 5 illustrates a simplified flowchart of an example of a response triggering event detection process.

FIG. 5 illustrates a simplified flowchart 500 of an example of a response triggering event detection process such as may be implemented within a thread executing on the processing core(s) 130 of the network interface module 100 of FIG. 1. The process starts at 510 with the detection of a response triggering event. For example, a response triggering event may be detected upon receipt of a specific message such as a response request from a master node, an interrupt, an error detection indication, an indication of a counter reaching a respective threshold, an indication of state within a network element of which the network interface module forms a part, etc. Next, at 520, a timing mechanism for timing a minimum response period is initialised. For example, the detected response triggering event may be timestamped or a time initialised to time the minimum response period. In the example illustrated in FIG. 5, the process comprises increasing the priority level of the Tx thread within the task scheduling component 140, at 530. In this manner, upon a masking timeout interval expiring and the Tx thread accordingly being unmasked, scheduling of the Tx thread for execution by the processing core(s) 130 will be a higher priority for the task scheduling component 140, thereby reducing any delay in the Tx thread being scheduled upon expiry of the masking timeout interval. A transmit enable flag is then set to indicate to the Tx thread that a response is required to be transmitted at 540. The process then ends, at 550.

Figure 6:
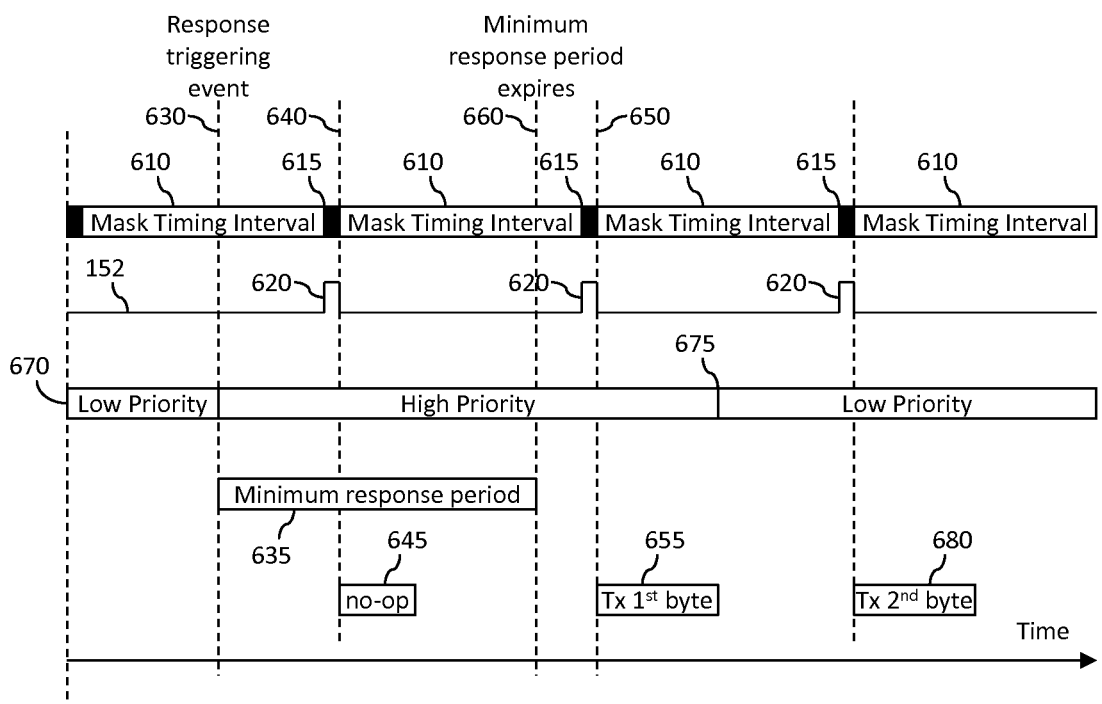
FIG. 6 illustrates a simplified timing diagram of an example of masking a transmit thread within a network interface module.

FIG. 6 illustrates a simplified timing diagram of an example of masking a Tx thread within the network interface module 100 illustrated in FIG. 1. Successive masking timeout intervals are illustrated at 610. The expiration of each masking timeout interval 610 is indicated at 615. As previously mentioned, the timing component 150 in the illustrated example of FIG. 1 is arranged to hold the masking timeout signal 152 at a logical '0' during masking timeout intervals 610, and to temporarily (e.g. for one or more clock cycle(s)) configure the masking timeout signal 152 to comprise a logical '1' upon expiration of each masking timeout interval 610, as indicated at 620 for each masking time interval 610.

In the example illustrated in FIG. 6, a response triggering event occurs at 630, and a timing mechanism for timing a minimum response period 635 is initialised. The priority level 670 for the Tx thread is also increased from a low/normal level to a higher level at 630, for example by the thread that detected the response triggering event. An expiration of a masking timeout interval 615 occurs at 640, resulting in the Tx thread being unmasked (as previously described). Accordingly, the Tx thread is executed at 645. However, since the minimum response period 635 has not yet expired, the Tx thread executes a simple 'no-op' routine and ends. Upon expiration 615 of the next masking timeout interval 610, indicated at 650, the Tx thread is again unmasked and subsequently scheduled for execution, as indicated at 655. This time, the Tx thread is scheduled to execute after the minimum response period 635 has expired, as indicated at 660. Accordingly, the Tx thread transmits the first block of the response frame. In the illustrated example, having transmitted the first block of the response frame, the Tx thread reduces its priority from the higher level back to the low/normal level, at 675. In this manner, the priority level for the Tx thread is only increased for a limited period of time to enable the first block of the response from to be transmitted with a minimum of a delay from the expiry of from the minimum response period 635. Upon each expiration 615 of subsequent masking timeout intervals 610, the Tx thread is unmasked and transmits the next block of the response frame, as indicated at 680, until the complete response frame has been transmitted. As illustrated in FIG. 6, the masking of the Tx thread and periodic unmasking upon expiration of masking timeout intervals enables the scheduling of the Tx thread to be limited to prevent unnecessary bus and processor bandwidth consumption by the Tx thread when no data is available for transmission (or whilst a minimum response period has not yet expired).

Figure 7:
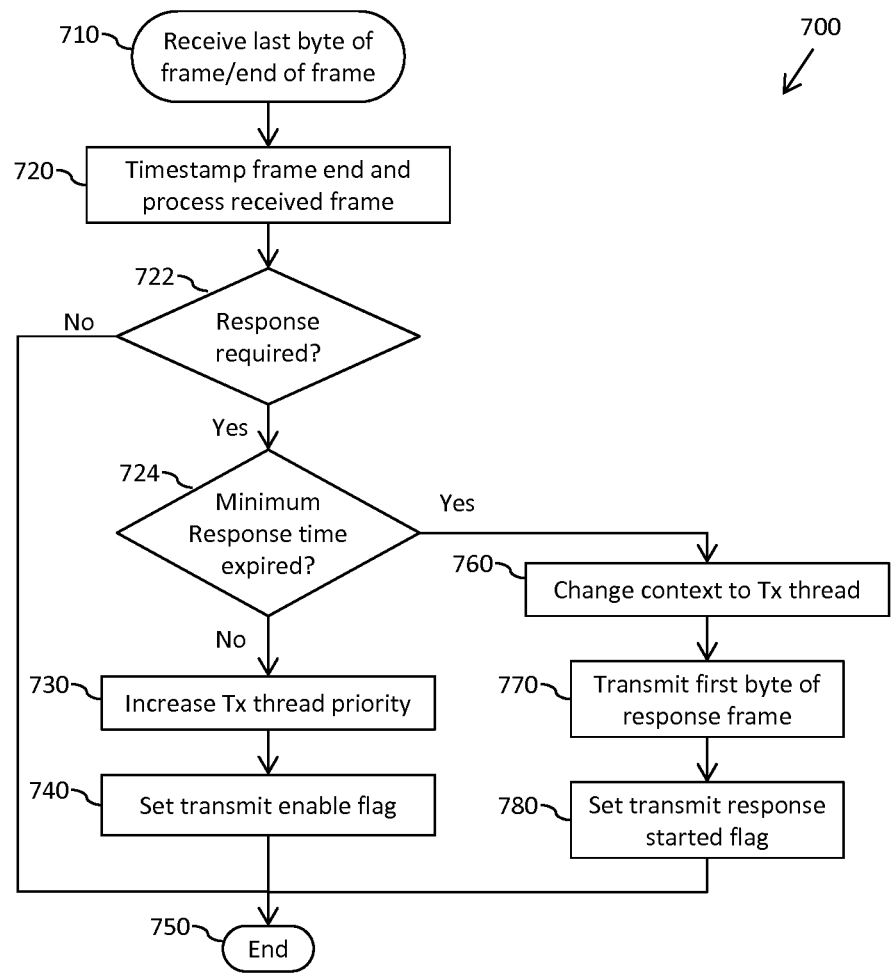
FIG. 7 illustrates a simplified flowchart of an alternative example of a response triggering event detection process.

Referring now to FIG. 7, there is illustrated a simplified flowchart 700 of an alternative example of a response triggering event detection process such as may be implemented within a task executing on the processing core(s) 130 of the network interface module 100 of FIG. 1. For example, the network interface module 100 may form a part of a PROFIBUS network, and be required to transmit a response frame upon expiry of a defined minimum response period from a master node request frame being received. It is important that such a response frame be transmitted in a controlled and deterministic manner in order to achieve a user defined latency and jitter. In the example network interface module 100 illustrated in FIG. 1, data frames received by the port 110 are initially stored within the Rx buffer 114, and are received one data block at a time with a typical data frame comprising multiple blocks of data. The Rx hardware 113 generates an Rx request signal 116 each time a data block is received, indicating that a data block is waiting within the Rx buffer for processing. The Rx request signal 116 is provided to the task scheduling component 140, and indicates to the task scheduling component 140 that an Rx thread for the port 110 is required to be executed in order to process the data block waiting within the Rx buffer for processing.

Accordingly, for the example illustrated in FIG. 7, a process triggering event comprises the receipt of a response request frame from, say, a master node of a PROFIBUS network. Such a process may be implemented within, say, an Rx thread executing on the processing core(s) 130 in response to an Rx request 116 being received by the task scheduling component 140 from the Rx buffer 114. The process of FIG. 7 starts at 710 with the receipt of the last byte (end of frame) of a frame. Next, at 720, a timing mechanism for timing a minimum response period is initialised, and the received frame is processed. In the example illustrated in FIG. 7, the timing mechanism comprises timestamping the last block of the received frame. In this manner, such timestamping of the last block of the received frame may be performed by the Rx thread executing on the processing core 130. Alternatively, it is contemplated that such timestamping may have previously been performed by the Rx hardware 113 of the MAC port 110. The process then moves on to 722 where it is determined whether a response frame is required to be transmitted in response to the received frame (e.g. whether the received frame comprises a response request frame from a master node). If it is determined that no response frame is required to be transmitted, then the process ends at 750. However, if it is determined that a response frame is required to be transmitted (e.g. it is determined that the received frame comprises a response request message from a master node) the process moves on to 724 where in the illustrated example it is determined whether a minimum response time for transmitted a response frame has expired.

If it is determined that the minimum response time for transmitting a response frame has not expired, the process moves on to 730 where, in the example illustrated in FIG. 7, the process comprises increasing the priority level of the Tx thread within the task scheduling component 140, at 730. A transmit enable flag is then set to indicate to the Tx thread that a response is required to be transmitted at 740. The process then ends, at 750. However, if it is determined that the minimum response time for transmitting a response frame has expired, at 724, the process of FIG. 7 moves on to 760, where the currently executing thread (e.g. the Rx thread) changes the context of the processing core 130 to that of the Tx thread, for example by causing the context for the Tx thread, from the task scheduling component 140, to be loaded into the internal memory/registers of the processing core 130. Having switched context to the Tx thread, the process moves on to 770 wherein a first block of the response frame is transmitted. A transmit response started flag is then set at 780, and the process ends, at 750.

Figure 8:
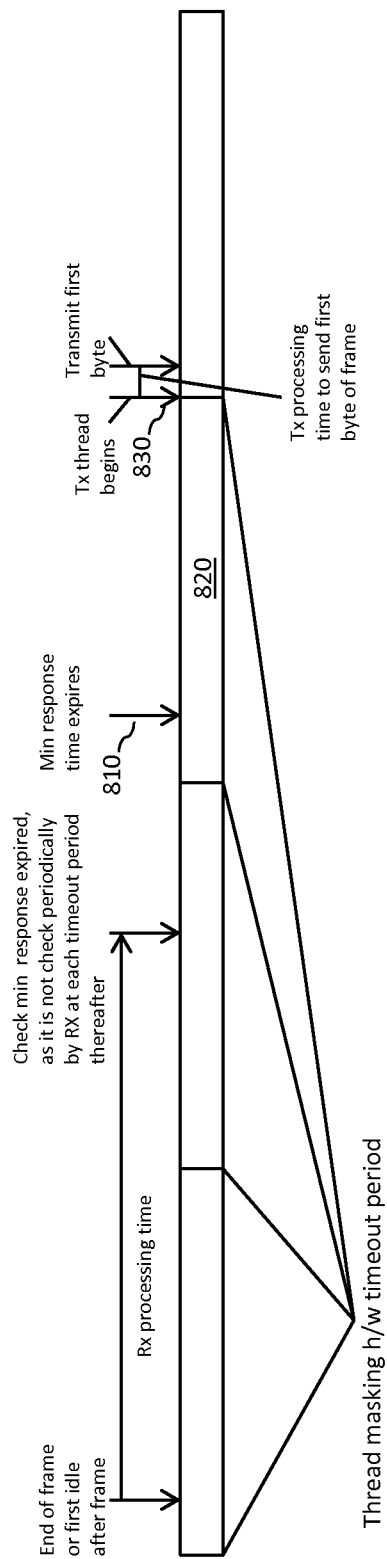
FIG. 8 illustrates a simplified timing diagram of an example of the transmission of a response frame.

FIG. 8 illustrates a simplified timing diagram of an example of the transmission of a response frame in response to receiving, say, a response request message from a master node, such as implemented in accordance with the process of FIG. 7. In the example case illustrated in FIG. 8, the minimum response period has been configured to a duration greater than the processing of the Rx thread for processing a received response request message. In the example illustrated in FIG. 8, the minimum response period expires at 810, shortly after the start of a masking timeout period 820. The start of the transmission of the response frame is delayed until the masking timeout period expires, at 830. As is apparent from FIG. 1, the maximum latency, and thus the maximum jitter, for transmitting response frames is approximately equal to the masking timeout period 820. Thus, the maximum latency and jitter for transmitting response frames may be deterministically controlled through the configuration of the masking timeout period 820.

Figure 9:
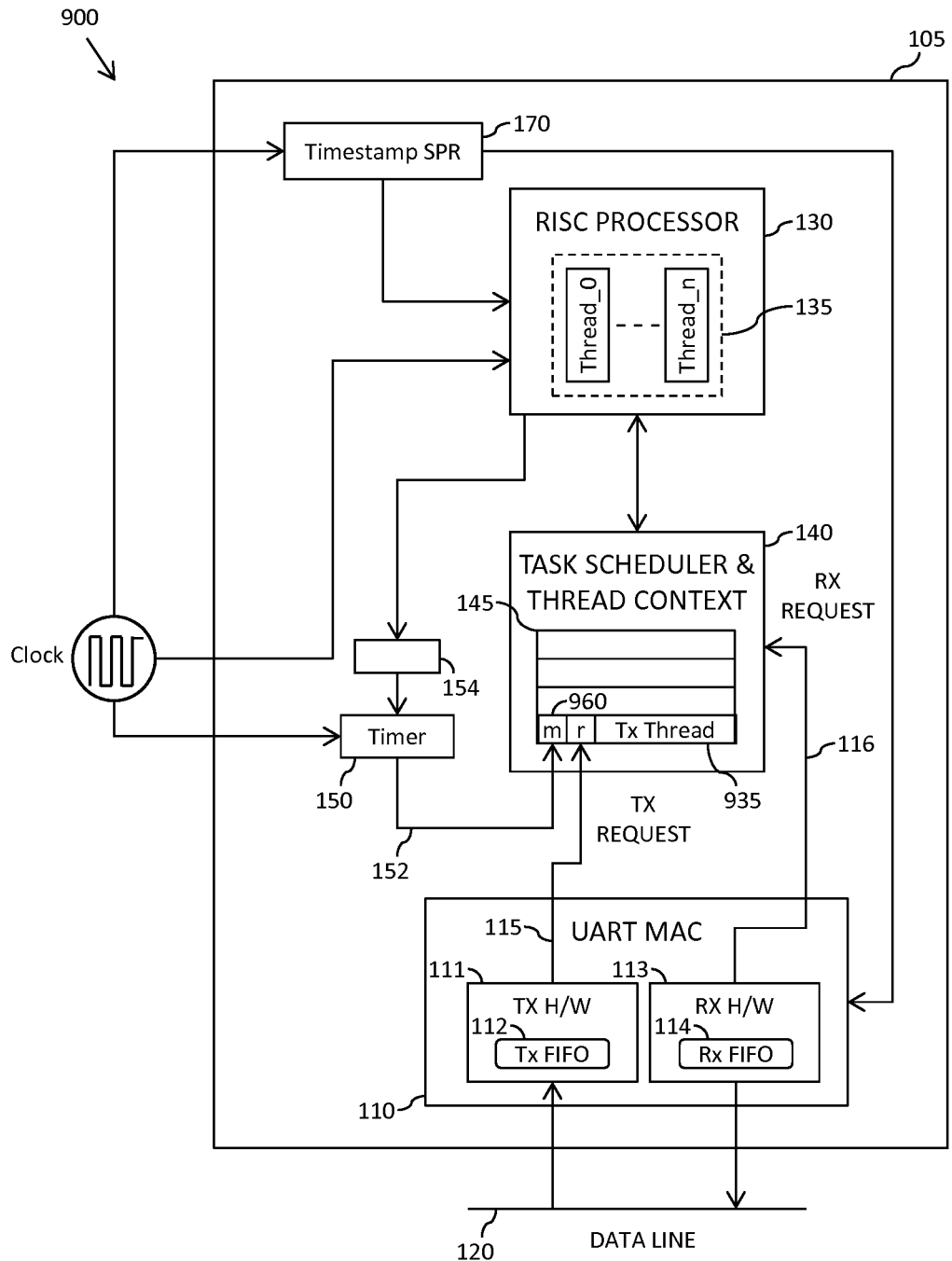
FIG. 9 illustrates a simplified block diagram of an alternative example of a network interface module.

Referring now to FIG. 9 there is illustrated a simplified block diagram of an alternative example of a network interface module 900 arranged to transmit and receive data frames over a computer network, such as a PROFIBUS network, Ethernet network, etc. The network interface module 900 comprises one or more ports, such as the UART MAC port indicated at 110 via which the network interface module 900 is able to be coupled to one or more computer networks, such as the computer network 120. The port 110 comprises separate Tx and Rx hardware 111, 113, which comprise separate Tx and Rx buffers 112, 114 for data to be transmitted over the computer network 120 and data received over the computer network 120 respectively.

The network interface module 900 further comprises at least one processor core, such as the RISC processor core 130 illustrated in FIG. 9. The processing core(s) 130 is/are arranged to execute a set of threads, indicated generally at 135. A task scheduling component 140 is arranged to control when threads can be executed by the processor core(s) 130, and stores therein thread context information 145 for configuring the processor core(s) 130 to execute the threads 135.

The network interface module 900 in the illustrated example is required to transmit a response frame after a defined minimum response period following the occurrence of a specific event, or type of event. The set of threads 135 arranged to be executed by the processing core(s) 130 comprises a transmit (Tx) thread 935 arranged to cause such a response frame to be transmitted upon expiry of a minimum response period from a response triggering event occurring.

In the example illustrated in FIG. 9, the network interface module 900 further comprises a timing component 150 arranged to output a masking timeout signal 152 indicating expiration of successive masking timeout intervals. In the illustrated example, the timing component 150 comprises a timer operably coupled to a memory element 154, for example a configurable register, within which a masking timeout parameter value is stored. The timer 150 is arranged to time masking timeout intervals corresponding to the masking timeout value stored within the memory element 154, and to output the masking timeout signal 152 indicating expiration of successive masking timeout intervals.

The network interface module 900 further comprises a masking component arranged to mask the Tx thread from being scheduled for execution by the processing core(s) 130. In the example illustrated in FIG. 9, the masking component comprises one or more masking bit cell(s) 960 arranged to be set to a first binary value upon the timing component 150 outputting a masking timeout signal 152 indicating expiration of a masking timeout interval, and the task scheduling component 140 is restricted to scheduling the Tx thread 935 for execution by the processing core(s) 130 when the mask bit cell 960 is set to the first binary value. In some examples, the task scheduling component 140 may be arranged to set the mask bit cell 960 to a second binary value upon scheduling the transmit thread for execution, thereby masking the Tx thread 935 from subsequently being scheduled for execution by the processing core(s) until the mask bit cell 960 is set to the first binary value upon the timing component 150 outputting a masking timeout signal 152 indicating expiration of a masking timeout interval.

In this manner, the scheduling of the Tx thread is arranged to be masked and periodically (upon expiration of successive masking timeout intervals) unmasked to prevent the Tx thread from continuously being scheduled to service Tx request signals 115 when no data is available to transmit (e.g. when there is no data to transmit or when the minimum response period for transmitting data has not yet expired). As a result, unnecessary bus and processor bandwidth consumption may be significantly avoided.

In some other examples, the at least one bit cell 960 (or a further bit cell) may be arranged to be set by the processing core(s) 130 to a second binary value upon the Tx thread 935 being scheduled for execution. For example, the Tx thread 935 may be arranged to set the at least one bit cell 960 upon being executed by the processing core(s) 130, thereby masking itself from subsequently being scheduled for execution by the processing core(s) until the mask bit cell 960 is set to the first binary value upon the timing component 150 outputting a masking timeout signal 152 indicating expiration of a masking timeout interval. The mask bit cell(s) 960 may be implemented in any suitable manner. For example the mask bit cell(s) 960 may be implemented within one or more special internal registers or within one or more memory mapped registers.

In the examples illustrated in FIGS. 1 and 9, the network interface modules 100, 900 have been illustrated and described as comprising a single port 110 for ease of understanding. However, it will be appreciated that such network interface modules 100, 900 may comprise multiple ports, with multiple Tx threads (one per port) arranged to be executed by the processing core(s) 130. It is contemplated that for such multi-port network interface modules, masking of the Tx threads as hereinbefore described may be implemented individually for each Tx thread. Furthermore, in a scenario in which the network interface module 100, 900 comprises multiple processing cores 130, the Tx and Rx threads for a port may be executed concurrently on different processing cores 130. In such a scenario, the jitter and latency timings may be improved due to the concurrent execution of the Tx and Rx threads.

Figure 10:
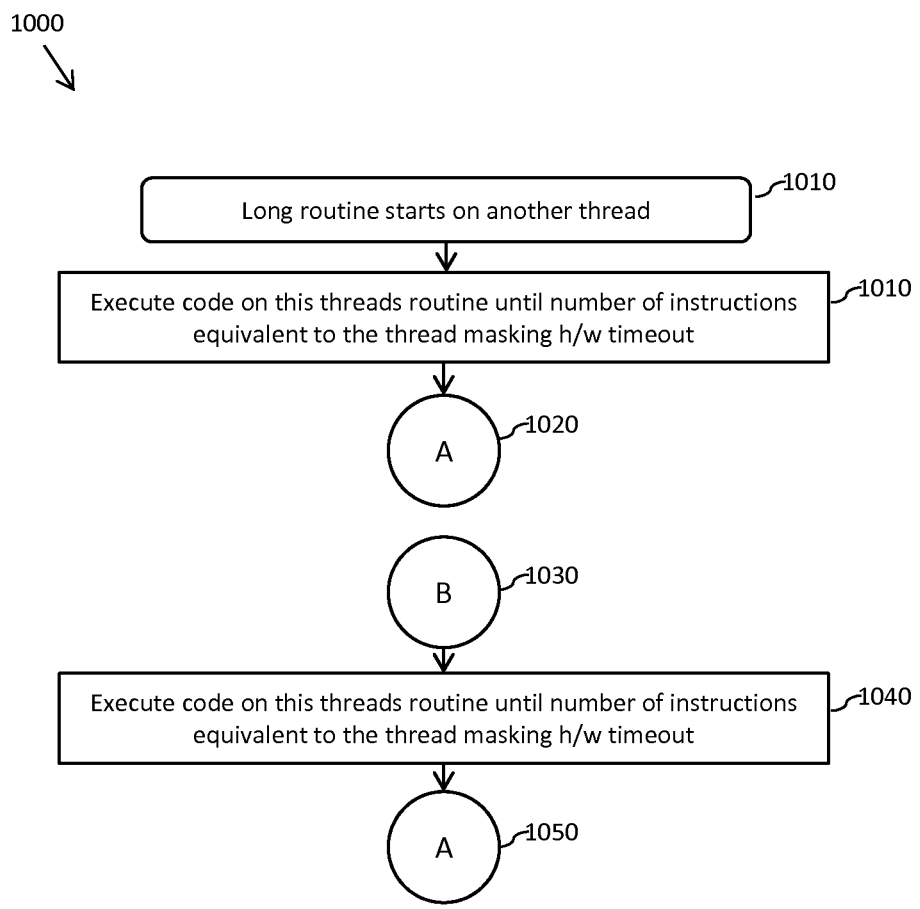
FIGS. 10 and 11 illustrate simplified flowcharts of an example of a process of enabling long threads to switch context to transmit threads to enable data blocks to be transmitted.
Figure 11:
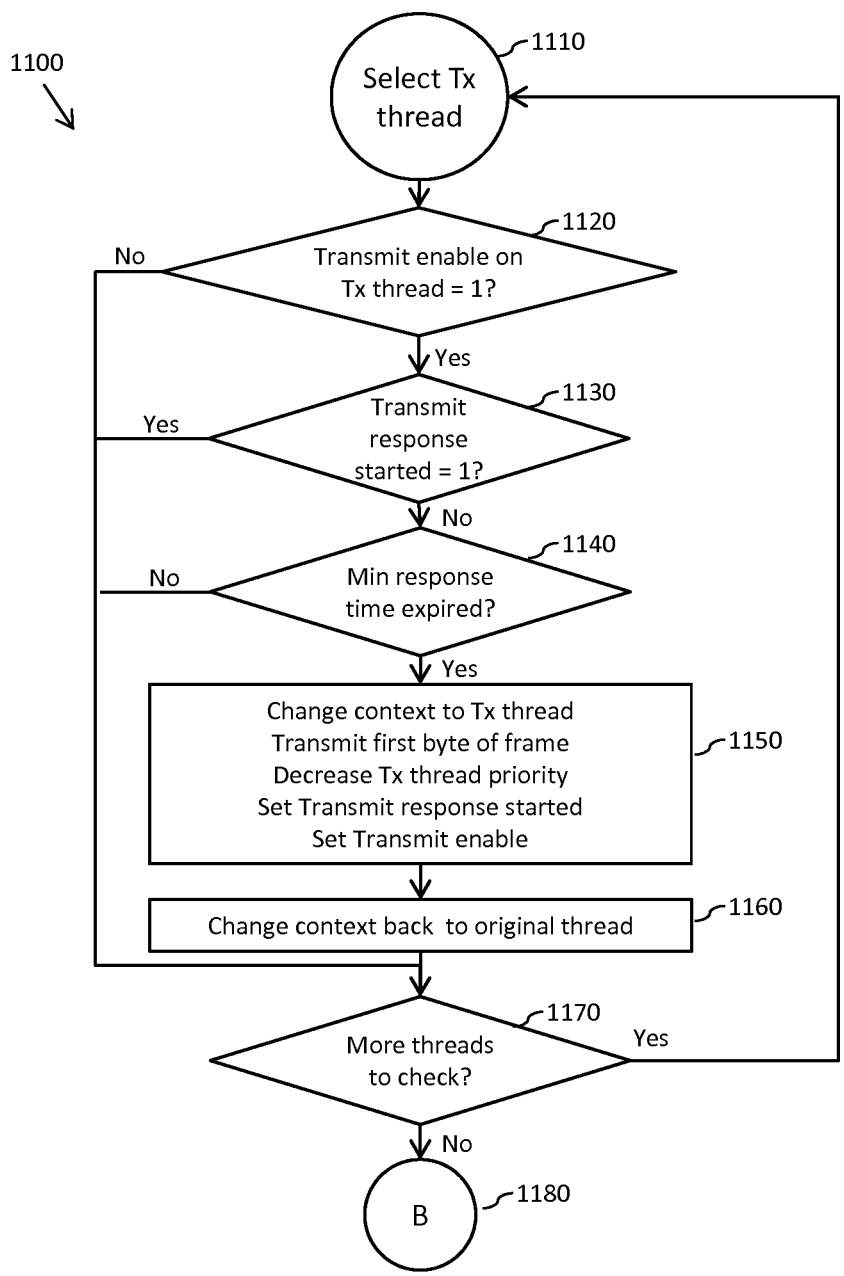

In some examples, the network interface module 100, 900 may comprise a high ratio of ports 110 to processing cores 130, for example multiple ports 110 but only a single processing core 130. In order to avoid long thread routines from monopolising the processing core(s) 130 and thereby preventing Tx threads for the ports 110 from being scheduled in a timely manner, it is contemplated that such long thread routines may be arranged to periodically determine whether a minimum response period has expired and a response frame is waiting to be transmitted, and if it is determined that a response frame is waiting to be transmitted to switch context to the respective Tx thread to enable the data block to be transmitted. Once the data block has been transmitted, the Tx thread can switch back to the original (long) thread. FIGS. 10 and 11 illustrate simplified flowcharts 1000, 1100 of an example of such a process of enabling long threads to switch context to Tx threads to enable data blocks to be transmitted. Referring first to FIG. 10, a long routine starts on a thread (other than a Tx thread) for one of the ports 110. The thread starts executing the computer program code for the routine until a number of instructions equivalent to the masking timeout interval have been executed, at 1010. Once the number of instructions equivalent to the masking timeout interval have been executed, the routine branches to a sub-routine illustrated by the flowchart 1100 of FIG. 11, at 1020. The sub-routine 1100 starts at 1110, where a Tx thread for one of the ports 110 is selected. The sub-routine then moves on to 1120 where it determines whether a transmit enable flag for the selected Tx thread has been set, indicating that the selected Tx thread is required to transmit a response frame. If it is determined that the transmit enable flag has not been set (e.g. comprises a logical '0' value), the sub-routine moves on to 1170, to determine whether Tx threads for other ports 110 need checking.

Conversely, if it is determined that the transmit enable flag has been set for the selected Tx thread the sub-routine moves on to 1130 where it determines whether a transmit response started flag has been set for the selected Tx thread, indicating that the transmission of a response frame has already been started for the selected Tx thread. If it is determined that the transmit enable flag has not been set (e.g. comprises a logical '0' value), the sub-routine moves on to 1170, to determine whether Tx threads for other ports 110 need checking.

Conversely, If it is determined that the transmit enable flag has been set for the selected thread, the sub-routine moves on to 1140, where it determines whether the minimum response period from a response triggering event has expired for the selected Tx thread. For example, the response triggering event may be timestamped. Accordingly, the sub-routine may be arranged to identify the timestamp for the response triggering event, and calculate the amount of time that has lapsed since the response triggering event occurred. Alternatively, a timer may be initialised upon the response triggering event occurring to expire after the minimum response period, and the sub-routine may be arranged to determine whether the timer has expired. If it is determined that the minimum response time has not expired, the sub-routine moves on to 1170, to determine whether Tx threads for other ports 110 need checking.

Conversely, if it is determined that the minimum response time has expired, the sub-routine moves on to 1150, where the sub-routine changes context to the selected Tx thread to transmit the first block of the response frame. In the illustrated example, the Tx thread scheduling priority is also decreased (e.g. having previously been increased by the respective Rx thread), and the Tx response started and Tx enable flags are set. The sub-routine then switches context back to the original thread, at 1160, and moves on to 1170, to determine whether Tx threads for other ports 110 need checking. If all Tx threads have been checked, the sub-routine returns to the original routine (FIG. 10), at 1180. Referring back to FIG. 10, upon returning to the original routine, at 1030, the routine resumes executing the computer program code for the routine until a number of instructions equivalent to the masking timeout interval have been executed, at 1040. Once the number of instructions equivalent to the masking timeout interval have been executed, the routine again branches to the sub-routine illustrated by the flowchart 1100 of FIG. 11, at 1050. This ensures that deterministic response latency and jitter is observed in systems which require intensive processing of data.

Figure 12:
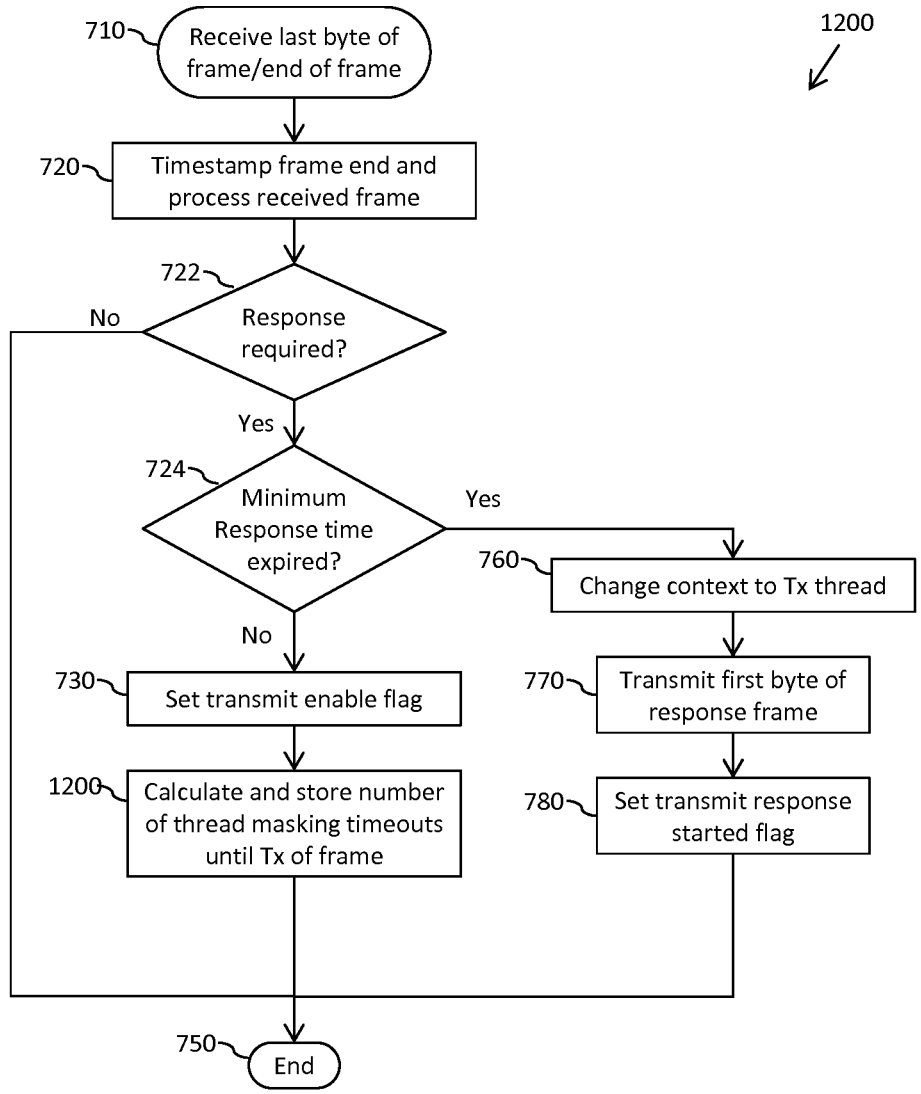
FIG. 12 illustrates a simplified flowchart of an alternative example of a response triggering event detection process.

As previously identified with reference to FIG. 8, the maximum latency and jitter for transmitting response frames may be deterministically controlled through the configuration of the masking timeout period. In some examples, it is contemplated that the minimum response time period may be significantly longer than the permitted jitter requirement. As such, because the masking timeout period is configured in accordance with the permitted jitter requirement, the masking timeout period will be significantly less than the minimum response time period. In order to prevent the Tx thread from being scheduled (at an increased priority in some examples) unnecessarily upon expiration of the masking timeout period whilst waiting for the minimum response time period to expire, a response triggering event detection thread (e.g. the Rx thread in the example where a response triggering event comprises receipt of a response request message from a master node) may be arranged to calculate and store a number of masking timeout intervals until the minimum response period for the detected response triggering event expires. FIG. 12 illustrates a simplified flowchart 1200 of an example of such a response triggering event detection process whereby the response triggering event detecting thread (e.g. Rx thread) is arranged to calculate and store a number of masking timeout intervals until the minimum response period for the detected response triggering event expires. The example process illustrated in FIG. 12 comprises substantially the same steps as the example process illustrated in FIG. 7, and as such the corresponding steps have corresponding reference numerals. Where the example process illustrated in FIG. 12 differs from that of FIG. 7 is where, if a response triggering event has been detected but the minimum response time for transmitting a response frame has not expired, the process comprises calculating and storing the number of masking timeout intervals until the minimum response period for the detected response triggering event expires, at 1200. Calculating and storing the number of masking timeout intervals until the minimum response period for the detected response triggering event expires in this manner enables, say, a transmit routine to read the number of masking timeout intervals until the minimum response period for the detected response triggering event expires, and if the number of such masking timeout intervals is equal to one, to cause the scheduling priority for the Tx thread to be increased. In this manner, the priority of the Tx thread will not be increased prematurely.

Figure 13:
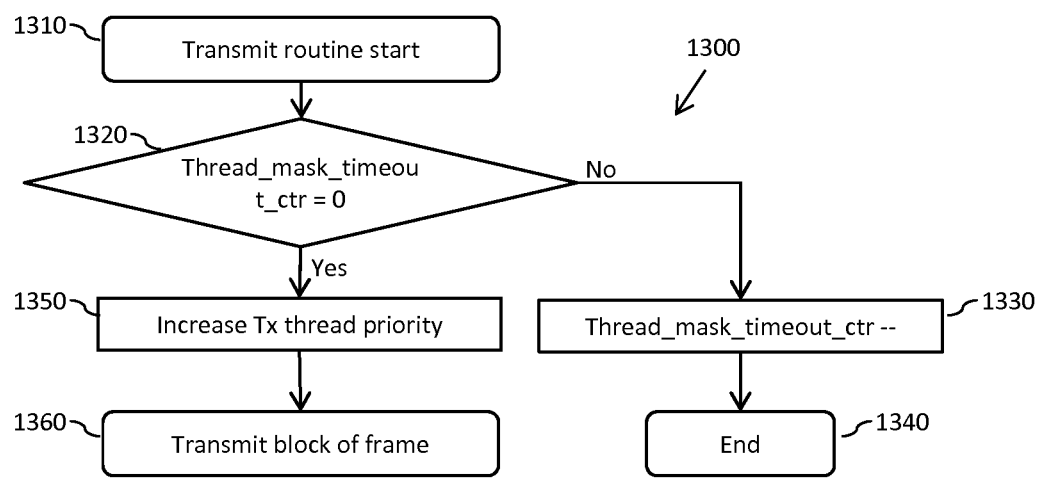
FIG. 13 illustrates a simplified flowchart of an example of a transmit routine.

For example, FIG. 13 illustrates a simplified flowchart of an example of such a transmit routine, which may be arranged to be run each time a masking timeout interval expires. In some examples, such a transmit routine may comprise part of the Tx thread, and be executed at the start of the Tx thread.

In the example illustrated in FIG. 13, the transmit routine starts at 1310, and moves on to 1320, where it is determined whether a masking timeout counter is equal to zero, the masking timeout counter having previously been set to a value equal to the number of masking timeout intervals until the minimum response period for the detected response triggering event expires by a response triggering event detection process, such as at 1200 in the example process illustrated in FIG. 12. If it is determined that the masking timeout counter is not equal to zero, the transmit routine moves on to 1330 where the masking timeout counter is decremented. The routine then ends at 1340. Conversely, if it is determined that masking timeout counter is equal to zero, the routine moves on to 1350 where the scheduling priority level for the Tx thread is increased. The next block of response frame data is then transmitted at 1360. For example, steps such as those of 210 to 270 in FIG. 2 may be implemented at 1360.

In some alternative examples, it is contemplated that a further improvement would be to allow the masking timeout interval to be dynamically changed. This would be especially useful when, say, the Tx thread is required to actively perform other lower priority tasks, and thus cannot be masked for prolonged periods of time.

Figure 14:
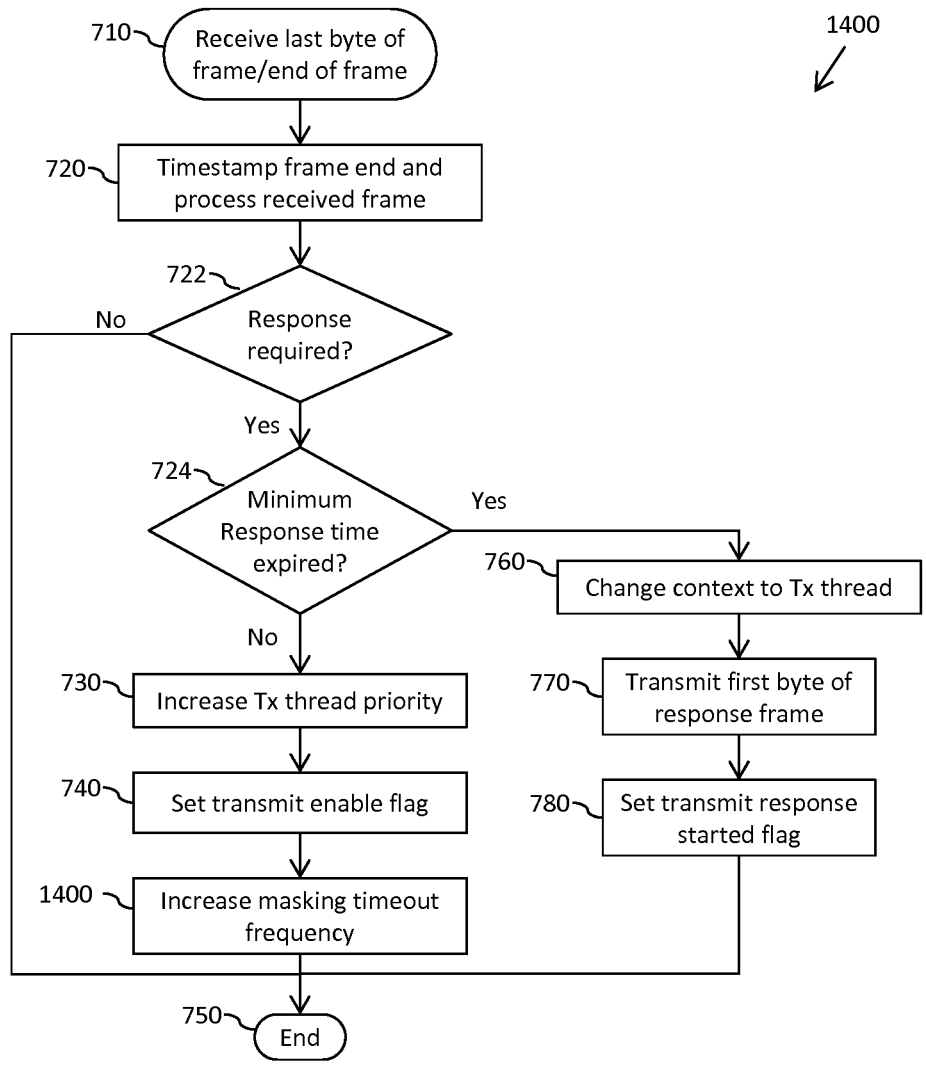
FIG. 14 illustrates a simplified flowchart of a further alternative example of a response triggering event detection process.
Figure 15:
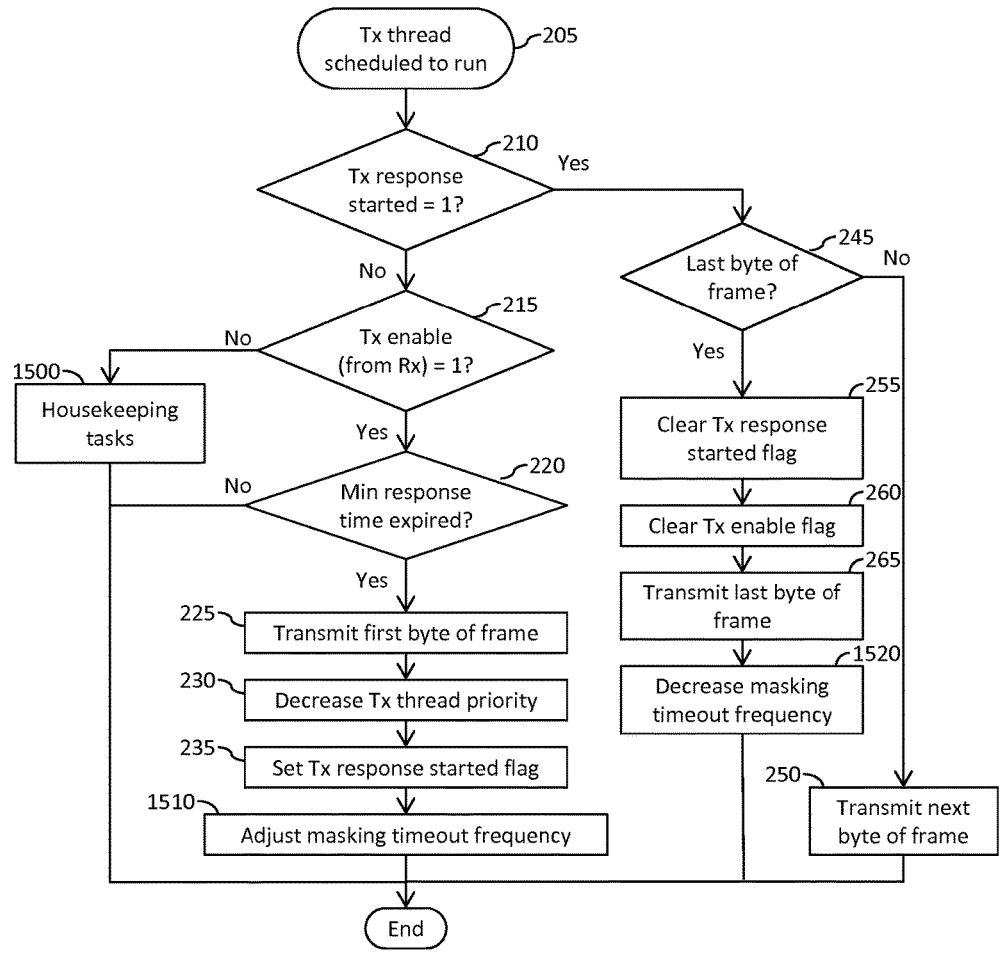
FIG. 15 illustrates a simplified flowchart of an example of an alternative transmit thread process.

FIG. 14 illustrates a simplified flowchart 1400 of an example of a response triggering event detection process whereby the response triggering event detecting thread (e.g. Rx thread) is arranged to increase the masking timeout frequency (e.g. by changing the masking timeout value stored within the memory element 154 in the example illustrated in FIG. 1). The example process illustrated in FIG. 14 comprises substantially the same steps as the example process illustrated in FIG. 7, and as such the corresponding steps have corresponding reference numerals. Where the example process illustrated in FIG. 14 differs from that of FIG. 7 is where, if a response triggering event has been detected but the minimum response time for transmitting a response frame has not expired, the process comprises increase the masking timeout frequency, at 1400. Increasing the masking timeout frequency in this manner enables the length of the intervals for which the Tx thread is masked to be reduced when a response triggering event has been detected. This increases the rate at which the masking timeout frequency expires, yielding a more deterministic response latency and jitter. FIG. 15 illustrates a simplified flowchart of an example of a Tx thread process in which the Tx thread is arranged to decrease the masking timeout frequency (e.g. by changing the masking timeout value stored within the memory element 154 in the example illustrated in FIG. 1). The example process illustrated in FIG. 15 comprises substantially the same steps as the example process illustrated in FIG. 2, and as such the corresponding steps have corresponding reference numerals. Where the example process illustrated in FIG. 15 differs from that of FIG. 2 is firstly, if it is determined that the transmit enable flag has not been set (e.g. comprises a logical '0' value), the Tx thread moves on to 1500 and performs low priority tasks such as housekeeping tasks, etc. before finishing at 270.

Secondly, if a response triggering event has been detected and the minimum response time for transmitting a response frame has expired, at 220, the process comprises adjusting the masking timeout frequency, at 1510, the masking timeout frequency being adjusted to not interfere with an ongoing frame transmission in terms of transmission rate per data block. It is contemplated that such adjustment may comprise increasing or decreasing the masking timeout frequency to a frequency that allows the Tx thread to transmit the remainder of the frame block by block, whilst not interfering with requests from other ports by timing out too frequently.

Thirdly, if the transmit response started flag has been set (e.g. comprises a logical '1' value) at 210, and the next block of data to be transmitted is the last block of the frame, at 245, the process comprises decreasing the masking timeout frequency, at 1520, for example counter to the increase performed at 1410 in FIG. 14. Decreasing the masking timeout frequency in this manner enables the length of the intervals for which the Tx thread is masked to be increased when a response triggering event has been detected. In this manner, once the first block of the frame has been transmitted, 225, the masking timeout is adjusted to a value sufficient for the processing core(s) 130 to transmit the remaining blocks of the frame and to minimise unnecessary bus and processor bandwidth. Once the transmission of the response frame has been completed, the masking timeout frequency may be lengthened again to minimise unnecessary bus and processor bandwidth.

Figure 16:
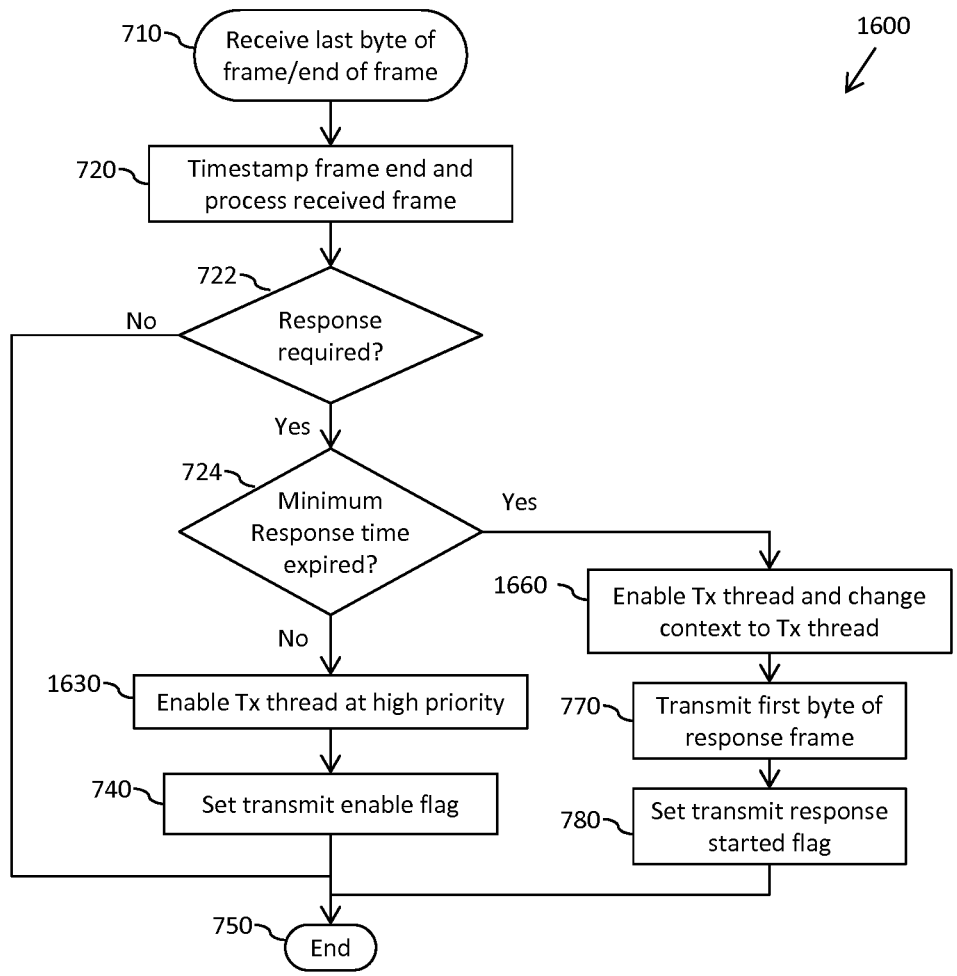
FIG. 16 illustrates a simplified flowchart of a further alternative example of a response triggering event detection process.

FIG. 16 illustrates a simplified flowchart 1600 of a further alternative example of a response triggering event detection process such as may be implemented within a task executing on the processing core(s) 130 of the network interface module 100 of FIG. 1, such as an Rx thread executing on the processing core(s) 130 in response to an Rx request 116 being received by the task scheduling component 140 from the Rx buffer 114. The example process illustrated in FIG. 16 comprises substantially the same steps as the example process illustrated in FIG. 7, and as such the corresponding steps have corresponding reference numerals. However, for the process of FIG. 16 the Tx thread is disabled (e.g. prevented from being scheduled for execution) until detection of a response triggering event, for example by way of an Tx thread enable flag within the task scheduling component 140. Accordingly, where the example process illustrated in FIG. 16 differs from that of FIG. 7 is that for the process illustrated in FIG. 16, when a minimum response time has not yet expired following detection of a response triggering event (e.g. receipt of a response request frame in the illustrated example), the Tx thread is enabled with a high scheduling priority, at 1630. The process of FIG. 16 differs from that of FIG. 7 also in that when the minimum response time has expired following detection of a response triggering event, the response triggering event detection process is arranged to enable the Tx thread and change context to the Tx thread, at 1660.

In this manner, the Tx thread may be disabled most of the time, and may only be enabled when, in the illustrated example, the Rx thread invokes it. The Tx thread may subsequently disable itself at the end of the response transmission. Thus, the Tx thread need only be requesting at high priority from the response triggering event until it transmits the first block of the frame. The Tx thread need only request/be enabled from the response triggering event until it transmits the last block of the frame. In this manner, the Tx thread will only consume a small amount of RISC/bus bandwidth.

At least parts of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the gating circuit 160 illustrated in FIG. 1 has been illustrated as a discrete component within the network interface module 100 for clarity and ease of understanding. However, it will be appreciated that such hardware components used to implement that masking of the Tx thread(s) may be integrated at least partly within, say, the respective part 110 and/or the task scheduler component 140.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the various components of the network interface module 100 may be implemented within a single integrated circuit device 105 as illustrated in FIG. 1. Alternatively, the examples may be implemented as any number of separate integrated circuits or separate devices interconnected with each other in a suitable manner. For example, in the illustrated example the processing core(s) 130, task scheduling component 140 and/or port 110 may be distributed across multiple integrated circuit devices without detracting from the present invention.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A network interface module arranged to transmit and receive data frames over a computer network; the network interface module comprising at least one processor core arranged to execute a set of threads, the set of threads comprising a transmit thread arranged to cause a response frame to be transmitted upon expiry of a minimum response period from a response triggering event occurring; wherein the network interface module further comprises:
   a timer arranged to output a masking timeout signal indicating expiration of successive masking timeout intervals;
   a task scheduler arranged to provide a masking signal output and to receive a transmit request signal; and
   a gating circuit having a first input to receive the masking timeout signal, a second input to receive the masking signal from the scheduler, a third input to receive an input transmit request signal and an output to provide the transmit request signal to the task scheduler, wherein the transmit request signal is based on the input transmit request signal,
      wherein in response to receiving the input transmit request signal and the masking timeout signal, the gating circuit is arranged to provide the transmit request signal to the task scheduler,
      wherein otherwise, in response to receiving the input transmit request signal and the masking signal while not receiving the masking timeout signal, the gating circuitry is arranged to not provide the transmit request signal to the task scheduler.

2. The network interface module of claim 1, wherein the task scheduler is further arranged to schedule the execution of threads by the at least one processing core; and to provide the masking signal to the gating circuit upon scheduling the transmit thread for execution.

3. The network interface module of claim 1, wherein the network interface module further comprises a transmit buffer arranged to provide the input transmit request signal to the gating circuit; wherein the task scheduler is further arranged to schedule the execution of threads by the at least one processing core;
   to receive the input transmit request signal from the transmit buffer of the network interface module through the gating circuit; and to schedule the transmit thread for execution by the at least one processing core upon receiving the input transmit request signal from the transmit buffer.

4. The network interface module of claim 1, wherein the task scheduler is further arranged to schedule the execution of threads by the at least one processing core;
   wherein the gating circuit comprises a mask bit cell arranged to be set to a first binary value upon receiving the masking timeout signal indicating expiration of a masking timeout interval; and
   the task scheduler is restricted to scheduling the transmit thread for execution by the at least one processing core when the mask bit cell is set to the first binary value.

5. The network interface module of claim 4, wherein the mask bit cell is further arranged to be set to a second binary value upon receiving the masking signal; and the task scheduler is further arranged to provide the masking signal in response to scheduling the transmit thread for execution by the at least one processor core.

6. The network interface module of claim 1, wherein the set of threads arranged to be executed by the at least one processor core comprises at least one further thread arranged to detect the occurrence of response triggering events, and upon detecting the occurrence of a response triggering event to perform at least one of:
   timestamping the detected response triggering event; and
   initialising a minimum response period timer.

7. The network interface module of claim 6, wherein the at least one further thread is further arranged to determine whether the minimum response period for the detected response triggering event has expired, and when it is determined that the minimum response period for the detected response triggering event has not expired, the at least one further thread is arranged to cause the scheduling priority for the transmit thread to be increased.

8. The network interface module claim 7, wherein when it is determined that the minimum response period for the detected response triggering event has expired, the at least one further thread is arranged to cause a first data unit of the response frame to be transmitted.

9. The network interface module of claim 7, wherein when it is determined that the minimum response period for the detected response triggering event has expired, the at least one further thread is arranged to change context to the transmit thread to transmit a first data unit of the response frame.

10. The network interface module of claim 6, wherein the at least one further thread is further arranged to determine whether the minimum response period for the detected response triggering event has expired, and when it is determined that the minimum response period for the detected response triggering event has not expired, the at least one further thread is arranged to calculate and store a number of masking timeout intervals until the minimum response period for the detected response triggering event expires.

11. The network interface module of claim 10, wherein the transmit thread is arranged to read the number of masking timeout intervals until the minimum response period for the detected response triggering event expires, and when the number of such masking timeout intervals is equal to one to cause the scheduling priority for the transmit thread to be increased.

12. The network interface module of claim 1, wherein response triggering events comprise at least one from a group comprising at least one of:
    specific frames received over the computer network;
    specific messages received internally;
    interrupts;
    error cases;
    counters reaching respective thresholds; and
    changes of state within a network element of which the network interface module forms a part.

13. The network interface module of claim 1, wherein the network interface module is arranged to transmit and receive data frames over a computer network comprising at least one of:
    an Ethernet protocol based computer network;
    a PROFIBUS protocol based computer network.

14. The network interface module of claim 1 implemented within an integrated circuit device comprising at least one die within a single integrated circuit package.

15. A method of implementing deterministic response frame transmission within a network interface module for a computer network, the network interface module comprising at least one processor core arranged to execute a set of threads, the set of threads comprising a transmit thread arranged to cause a response frame to be transmitted upon expiry of a minimum response period from a response triggering event occurring; wherein the method comprises:
    receiving, at a gating circuit, a masking timeout signal indicating expiration of successive masking timeout intervals from a timer;
    receiving, at the gating circuit, an input transmit request indication;
    receiving, at the gating circuit, a masking signal from a task scheduler;
    in response to receiving the input transmit request indication and the masking timeout signal, providing, by the gating circuit, an output transmit request indication to the task scheduler;
    in response to receiving the input transmit request signal and the masking signal while not receiving the masking timeout signal, not providing, by the gating circuit, the output transmit request indication to the task scheduler;
    wherein the output transmit request indication is based on the input transmit request indication.

16. The method of claim 15, wherein the method further comprises providing the masking signal upon scheduling the transmit thread for execution.

17. The method of claim 15, wherein
    in response to receiving the masking signal by the gating circuit, setting at least one mask bit cell to a second binary value, wherein the task scheduler is restricted to scheduling the transmit thread for execution by the at least one processing core when the at least one mask bit cell is set to a first binary value.

18. The method of claim 15, wherein the method further comprises, when executing at least one further thread, determining whether the minimum response period for a detected response triggering event has expired, and when it is determined that the minimum response period for the detected response triggering event has not expired
    calculating and storing a number of masking timeout intervals until the minimum response period for the detected response triggering event expires.

19. The method of claim 15, wherein the response triggering events comprise at least one from a group comprising at least one of:
    data frames received over the computer network;
    interrupts;
    error cases;
    counters reaching respective thresholds; and
    changes of state within a network element of which the network interface module forms a part.

20. The method of claim 15, wherein the network interface module is arranged to transmit and receive data frames over a computer network comprising at least one of:
    an Ethernet protocol based computer network;
    a Profibus protocol based computer network.

* * * * *